Patented Apr. 3, 1951

2,547,429

UNITED STATES PATENT OFFICE 2,547,429

ISOLATION OF ENZYMES FROM AQUEOUS SOLUTIONS WITH LIGNIN AND GELATIN AND PRODUCT OBTAINED THEREBY

Ralph T. Alba, New York, N. Y., assignor, by mesne assignments, to Wallerstein Company, Inc., New York, N. Y., a corporation of New York No Drawing. Application October 26, 1945, Serial No. 624,935

14 Claims. (Cl. 195—17)

The present invention relates to the separation of enzymes of different kinds from aqueous solutions or suspensions, and more particularly to their removal from such solutions or suspensions in the form of a more or less insoluble complex with lignin by the aid of gelatin, and to the complex so formed.

The present invention is an improvement over the process described in the co-pending application of James S. Wallerstein and Ralph T. Alba, Serial No. 584,732, filed March 24, 1945, Patent No. 2,452,000, issued October 19, 1948, and entitled "Process for the Recovery of Enzymes from Aqueous Solutions and Product Obtained Thereby."

The primary object of the present invention is to provide an improved procedure whereby a more efficient recovery of the enzymes from their aqueous solutions and suspensions may be obtained.

A further object of the invention is to provide a procedure according to which a maximum recovery of the enzyme can be obtained under conditions of reduced acidity, that is, under more nearly neutral conditions than with the process described in the above-mentioned application.

It is a further object of the invention to provide a procedure whereby not only is the enzyme recovered in high yield, but also in a highly active form.

A further object of the invention is to provide a process for the concentration and recovery of enzymes from aqueous solutions or suspensions with the aid of inexpensive reagents which do not interfere with the activity of the enzymes nor contaminate them with substances deleterious to their activity or to the materials or processes with which they are subsequently to be employed.

Further objects and advantages of the invention will be apparent from the following more detailed description of the invention.

At present, enzymes are used for a variety of industrial purposes as, for example, the desizing of starch (amylase) or the dehairing of leather (proteases). They are derived from animal or plant sources or may be produced by growing certain types of microorganisms on suitable media from which the enzymes are extracted and precipitated. Thus, for example, the mould *Aspergillus oryzae* may be grown on moistened bran, forming a substantial quantity of diastatic enzyme which may be extracted with water. Strains of Aspergillus may be adapted to the production of a tryptic protease extractable in water preferably by prolonged shaking in the presence of toluol or other substances which will speed rupturing of the cells and freeing of the enzymes into the solution.

These methods of separation, while yielding satisfactory recoveries of enzymes, require the use of rather expensive materials and somewhat cumbersome operations. In the case of precipitation of the enzymes with organic solvents, the process becomes commercially prohibitive because of the cost of the solvent unless a high degree of recovery of the solvent is provided for; such recovery, however, requires elaborate equipment with additional outlays in fuel, labor, etc. Where precipitation with the aid of salts is resorted to, the cost of the process is considerably increased by the large quantities of salt required; moreover, the presence of the salt may be undesirable for certain uses of the enzyme, so that further purification, as by means of organic liquids, must frequently be resorted to.

In accordance with the present invention there is employed for the concentration and recovery of enzymes from aqueous solutions and suspensions both the lignin described in the above-mentioned application, and also a quantity of gelatin. As described in the aforementioned application, the lignin employed forms an enzyme-lignin complex which is soluble at the pH range at which the enzyme is active, but is insoluble at lower pH values. According to the present invention, the enzyme-containing solution or suspension is treated with a small quantity of gelatin in the manner more specifically described hereinbelow and thereafter or simultaneously is treated with an alkali-soluble, but acid-insoluble lignin, the lignin being added at a mildly alkaline pH value to the enzyme solution, and the enzyme-lignin complex then precipitated from the enzyme gelatin-lignin-containing solution at a mild acidity. The lignin precipitation removes the enzyme from solution together with other protein and colloidal matter that may be present, including the gelatin. The enzyme may again be made active by dissolving the precipitate in dilute alkali or at any pH value at which the enzyme is active and at which the enzyme-lignin complex is soluble. The process is simple, inexpensive, and can be carried out with a high degree of efficiency with respect to enzyme recovery.

It has already been suggested to employ various lignins, including solubilized lignins, for the precipitation of various kinds of suspended matter, for example, sewage. However, so far as I am aware, it has not been known that enzymes can be precipitated with solubilized lignins and particularly with a specific type of solubilized lignin to which we shall refer more fully hereinbelow. Nor has it been known that enzymes can be precipitated with a lignin solution of such character and in such a way that the activity of the enzyme is not injured, and that the enzyme-lignin complex can be utilized in the same way as the enzyme itself has heretofore been employed without unfavorably affecting the hydrolytic or other process for which the enzyme is used, or the material on which it acts.

The term "lignin" is generally applied to a class of substances which constitute that part of the wood not directly extractable by solvents like alcohol or benzine, and not converted, like cellulose, into lower molecular weight carbohydrates by hydrolysis with mineral acids. The lignin which remains after the hydrolysis of the cellulose components of wood with strong mineral acids, is water-insoluble. It may, however, be converted into the water-soluble forms of lignin by chemical treatment, for example, by treatment with nitric acid to form nitro-lignin, or by halogenation.

Another solubilized form of lignin is obtained in the manufacture of cellulose from paper pulp, in which process lignin is solubilized while the insoluble cellulose is left behind. One of these processes involves digestion with bisulfite, whereby the lignin is converted into a crude form of lignosulfonic acid or its salts which are concentrated and solid commercially as sulfite waste liquor. Another form of water-soluble lignin is prepared by the so-called alkaline cook process in which wood is cooked with caustic soda. The dissolved lignin in the "black liquors" can be precipitated by neutralizing the alkali, for example, by passing carbon dioxide gas through the liquor (see, for example, E. B. Brookbank, Chemurgic Digest, June 30, 1943, "Recovery and Uses of By-Product Soda Lignin"), or by means of acids like sulfuric and hydrochloric.

It is the latter material which, after drying, represents the lignin matter employed in my invention. This lignin obtained by the alkaline cook process and in the form either of the acid-precipitated material which can be redissolved in diluate alkali, or in the form of the water-soluble alkali metal salt is, as I have found, capable of efficiently precipitating enzymes which are active at pH values above 5.0, the precipitate being in a form in which the enzyme retains its activity and on resolution of the precipitate at the pH value at which the enzyme is most active, no loss of activity is apparent. I have found that other forms of lignin, including nitro-lignin, lignosulfonic acid, and various water-insoluble lignins are much less advantageous for the purposes of the present invention than the alkaline cook lignin.

As already indicated, the alkaline cook lignin which has been precipitated with carbon dioxide or acid, can be brought into solution with dilute alkali. It is generally best to use a minimum quantity of alkali, that is, only to the solubility point of the lignin, so as not to affect the pH of the enzyme extract more than necessary.

I have found that the precipitation of enzymes by lignin is dependent not only on the proportion of precipitant added to the enzyme and other protein matter to be precipitated, but also to the absolute quantity of proteid or nitrogenous material present. When the solution contains an inadequate quantity of such nitrogenous matter, precipitation of the enzyme is incomplete. By the addition of gelatin to such a dilute solution of enzyme, I am able to secure a fuller and more complete precipitation of enzyme. Thus I have found that where an enzyme solution contains less than 0.3 milligram of nitrogen per cc., the addition of gelatin becomes of importance in securing a high degree of recovery. In general, as pointed out in the earlier application, maximum precipitation of enzyme-lignin occurs at a pH of approximately 4.0–4.5 (in the absence of an addition of gelatin). Some enzymes, however, may be undesirably affected by this relatively high hydrogen ion range (i. e., low pH value), and should preferably be precipitated at a point closer to neutrality. I have found further that my invention makes it possible to shift the pH value of optimum recovery upwards to a less acid range of pH values. I have discovered also that a further effect of the gelatin is to protect the enzyme against inactivation in the presence of acid. It is desirable to keep the pH value from falling too low, for example, to a value of 3.0, as such highly acid condition may inactivate certain enzymes in the lignin complex so that it cannot be reconstituted to full activity. However, this danger of inactivation at low pH values is considerably reduced by the presence of the gelatin.

The amount of gelatin required is of the order of one part to 10–20,000. It is preferably added in the form of a two per cent aqueous solution prior to the addition of the lignin, the mixture being stirred after the lignin solution has been added, after which the solution is acidified and the resulting precipitate centrifuged or otherwise separated.

The precipitate, as described in the earlier application, is dried on a flat surface in the presence of a suitable salt, like sodium bicarbonate, sodium phosphate, disodium phosphate, or other mildly alkaline salt or buffer substance in order to neutralize the acidity of the precipitate. The presence of the gelatin appears to speed the rate of drying of the precipitate.

The addition of the alkaline compound or buffering agent facilitates the re-solution of the precipitate in water, and also prevents inactivation by reason of increased acidity of the enzyme-lignin-gelatin complex through concentration during the drying process. By the addition of small amounts of alkaline salts to the precipitate, prior to the drying, re-solution may be carried out merely by the addition of water; otherwise, a somewhat alkaline solution may be required. Drying may be speeded by mixing the precipitate with a small amount of a suitable carrier substance, as, for example, anhydrous sodium sulfate or lactose. By the use of such a carrier, the dried product may be more readily removed from the drying surface. The gelatin aids these carrier substances in preventing inactivation during drying. The dried material thus prepared is stable in respect to enzyme activity.

For ready solubility of the enzyme-lignin-gelatin complex, a slight alkalinity is generally required (pH 8.0–9.5). Where, however, the enzyme has a lower optimum pH activity, it is possible to adjust the pH after having re-dissolved the enzyme. The pH, however, cannot be lowered substantially below about 5.5 because then the enzyme-lignin complex will re-precipitate.

The amount of lignin required for complete precipitation will depend upon the amount of precipitable matter in the enzyme extract, including added gelatin. To achieve full precipitation it is advisable to add sufficient lignin to clarify the solution. Below this point, the amount of enzyme precipitated will be more or less proportional to the amount of lignin added. The amount required is best determined by preliminary experiment in each case.

Since heating of the solution will in most cases tend to inactivate the enzyme, it is desirable to maintain a temperature no higher than about 30° C.

My process is suitable for recovery of enzymes active at pH's within the range of pH 5.0 and above (up to at least pH 11.0), that is, at ranges within which the enzyme-lignin-gelatin complex is soluble. It would not be suitable for enzymes whose activity is restricted to conspicuously acid pH's, such as pepsin. My improved method may be satisfactorily applied to such enzyme preparations as malt diastase, animal pancreas, mould trypsin, bacterial and mould amylases, etc., having an optimum activity within the range cited.

The following examples illustrate satisfactory procedures for carrying out the invention and the advantages obtained thereby, but the same are to be understood as being presented for illustrative purposes only and not as indicating the limits of the invention.

EXAMPLE I

To compare the results obtained by the treatment of a malt diastase infusion with an alkali-cook lignin solution both without and with the addition of gelatin, the following series of experiments were conducted:

3 cc. of a 5% alkali-cook lignin solution were added to 50 cc. of a 2½% malt diastase infusion. The lignin solution was prepared by dissolving the lignin in N/10 NaOH and the solution adjusted to a pH of 8.5 by the addition of phosphoric acid. To a number of mixtures of the infusion and the lignin solution, prepared in the manner just described, there were then added quantities of 10% phosphoric acid solution to bring the pH to the different values shown in Table I. After the addition of acid in each instance, samples were centrifuged, the supernatant removed, and the precipitate dried on a large surface in a current of air after admixture of the precipitate with a small quantity of mixed primary and secondary sodium phosphate (containing about 40% primary phosphate) so as to yield a pH of approximately 6.4.

The dried precipitate was in each case redissolved in water and made back to its original volume. It was tested by the beta diastase method of the American Society of Brewing Chemists (Methods of Analysis, Third Revised edition, 1940, pp. 1-4), in soluble starchy solution buffered at pH 6.4. The original infusion was similarly tested and the results expressed in Table I indicate the per cent recovery of the lignin precipitate at the various hydrogen concentrations.

A parallel series of precipitations was carried out in accordance with the invention, wherein the malt infusion (50 cc.) was mixed with 0.2 cc. of a 2% aqueous gelatin solution prior to the lignin addition.

The nitrogen content of the original infusion was 0.12 mg. per cc. After addition of the gelatin the nitrogen content was 0.14 mg. per cc.

The greatly increased enzyme recovery attained by the use of the small addition of gelatin is illustrated by the following:

TABLE I

Per cent recovery

| pH | Lignin | Lignin Plus Gelatin | Increase over Lignin Alone |
|---|---|---|---|
| | Per cent | Per cent | Per cent |
| 3.5 | 45 | 62 | 38 |
| 3.8 | 52 | 75 | 44 |
| 4.0 | 56 | 81 | 45 |
| 4.2 | 62 | 86 | 39 |
| 4.5 | 64 | 88 | 37 |
| 4.8 | 59 | 92 | 56 |
| 5.0 | 50 | 90 | 80 |
| 5.2 | 20 | 66 | 230 |

It will be noted from the table that not only is the recovery of enzyme considerably higher when gelatin is employed, but the maximum recovery is shifted in the direction of higher pH values during the precipitation.

EXAMPLE II

A 5% malt infusion with an original diastatic power of 156°L was precipitated with 5% alkali-cook lignin at various pH's and then tested with mixed Fehling solution at pH 6.5.

The amount of lignin added was 4 cc. per 50 cc. of the malt diastase solution containing 0.23 mg. nitrogen per cc. In the parallel series of determinations 0.2 cc. of 2% gelatin solution was added to the diastase solution prior to the addition of the lignin. The comparative recoveries at the various pH's of precipitation are illustrated in Table II.

TABLE II

| pH | Lignin | Lignin plus Gelatin | Increase Over Lignin Alone |
|---|---|---|---|
| | Per cent | Per cent | Per cent |
| 3.5 | 41 | 40 | -2.5 |
| 3.9 | 65 | 60 | -7.7 |
| 4.2 | 86 | 84 | -2.4 |
| 4.5 | 91 | 90 | -1.1 |
| 4.7 | 90 | 91 | 1 |
| 5.0 | 86 | 92 | 7 |
| 5.2 | 55 | 90 | 64 |
| 5.3 | 20 | 91 | 355 |
| 5.5 | 0 | 84 | ∞ |
| 5.8 | 0 | 60 | ∞ |

I have found that the addition of gelatin gives much superior results to those obtained with other water-soluble proteins which are precipitable by lignin. These comparable results were not achieved by the addition of casein, cereal protein or meat extract.

Of course, other acids can be employed to adjust the pH, for example, sulfuric acid, or organic acids of sufficient strength, like acetic acid.

The drying of the precipitated enzyme-lignin-gelatin complex, as indicated above, can be facilitated by the addition of both alkaline salts and neutral materials like sodium sulfate, lactose, etc.

I claim:

1. The method of separating from aqueous solution an enzyme active at pH values of 5 and above without inactivation thereof, which comprises precipitating the enzyme by means of a water-soluble alkali-cook lignin and gelatin from an aqueous solution of the enzyme under acid conditions but at a pH value not substantially below 4 so as to form a complex insoluble under such acid conditions, but soluble at higher pH values.

2. The method according to claim 1, wherein the mixture of the enzyme solution and the lignin and gelatin has originally a pH value in the alkaline range, and wherein the mixture is acidified to a pH value of about 4.0.

3. The method according to claim 1, wherein the enzyme-containing solution is adjusted, after the addition of the lignin and gelatin, to a pH value between 4.7 to 5.7, and the enzyme-containing complex precipitating in this acid range is separated.

4. Process according to claim 1, wherein the enzyme solution is a solution of malt diastase.

5. The method according to claim 1, wherein the amount of gelatin added is not less than one part to 30,000 nor more than one part to 10,000 parts.

6. The method according to claim 1, wherein the gelatin is added to an enzyme-containing solution having less than 0.3 mg. of nitrogen per cc.

7. The method according to claim 1, wherein the precipitated complex is separated from the solution and ultimately dried.

8. The method according to claim 1, wherein the precipitated complex is separated from the solution and dried, and thereafter is re-dissolved in dilute alkali.

9. The method according to claim 1, wherein the precipitated complex is mixed with a small amount of an alkaline material, and is then dried.

10. The method of separating from aqueous solution an enzyme active within the pH range of 5 to 11 and without inactivating the same, which comprises precipitating the enzymes with a water-soluble alkali-cook lignin and gelatin from a solution of the enzyme by the addition of acid to the mixture until it has a pH value below 5.7 but higher than the value at which the enzyme becomes inactivated, whereby an enzyme-lignin gelatin complex is precipitated, removing the precipitate, mixing the same with a small amount of alkaline material and drying the mixture.

11. The method of separating from aqueous solution an enzyme active at a pH value of about 5 and higher and without inactivating the same, which comprises causing the enzyme to precipitate under acid conditions but at a pH value no lower than 4 with the aid of a water-soluble alkali-cook lignin and of gelatin, and removing the enzyme-containing precipitate.

12. The method according to claim 11, including the step of mixing the separated precipitate with a carrier substance, and drying the mixture.

13. An enzyme-lignin-gelatin complex which is insoluble to a large extent in dilute acid solutions having a pH value below 5, said complex being soluble in dilute alkali, and in solution having enzymatic activity at a pH value within the range of about 5.0 to 11.0.

14. A complex as defined in claim 13, wherein the enzyme is malt diastase.

RALPH T. ALBA.

REFERENCES CITED

The following references are of record in the file of this patent:

UNITED STATES PATENTS

| Number | Name | Date |
| --- | --- | --- |
| 695,254 | Weber | Mar. 11, 1902 |
| 1,444,250 | Kern | Feb. 6, 1923 |
| 1,866,633 | Ehrenreich | July 12, 1932 |
| 2,452,000 | Wallerstein et al. | Oct. 19, 1948 |

OTHER REFERENCES

Chemical Abstracts, 27: 5130 (9), taken from Soil Science 36, Waksman and Iger (1933), pp. 69–82. Note page 70.

Morrow, "Lignin Put to Work," Science News Letter, November 4, 1944, page 298.

Wilson et al., J. Am. Leather Assoc. 38, 20 (1943), pp. 21 and 22.

Sumner et al., Enzymes, Academic Press, Inc., New York, N. Y., 1943, page 7.